July 6, 1965 R. G. WERDEN 3,192,736
AIR CONDITIONING SYSTEM AND METHOD
Filed Aug. 30, 1963 2 Sheets-Sheet 2
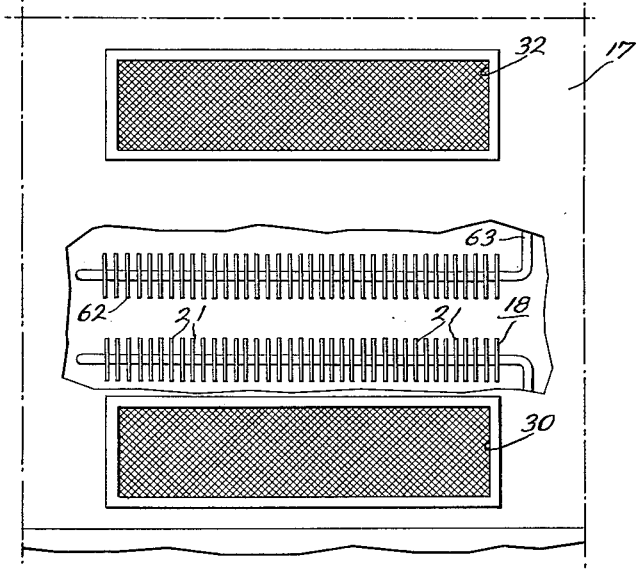
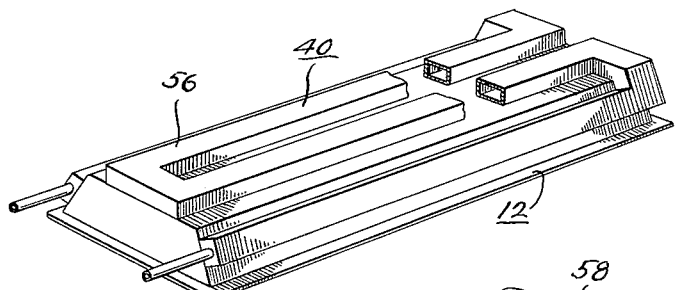
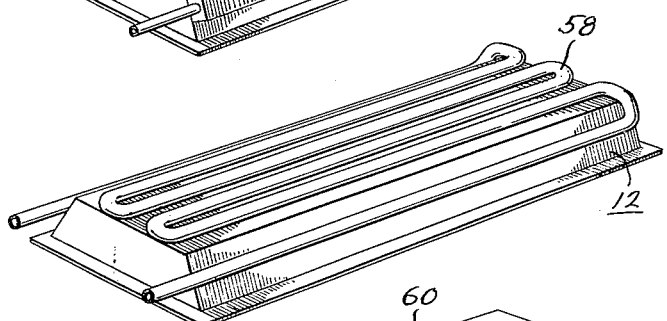
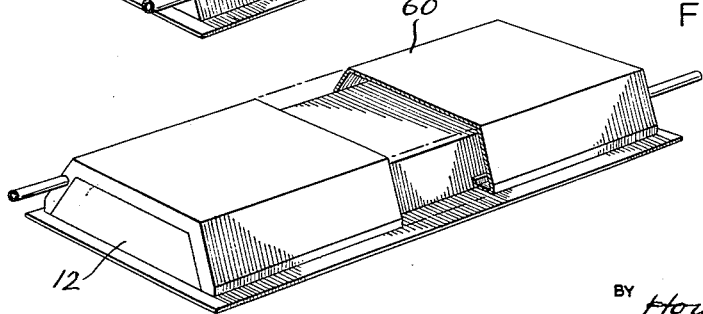
INVENTOR.
ROBERT G. WERDEN
BY Howson & Howson
ATTYS.

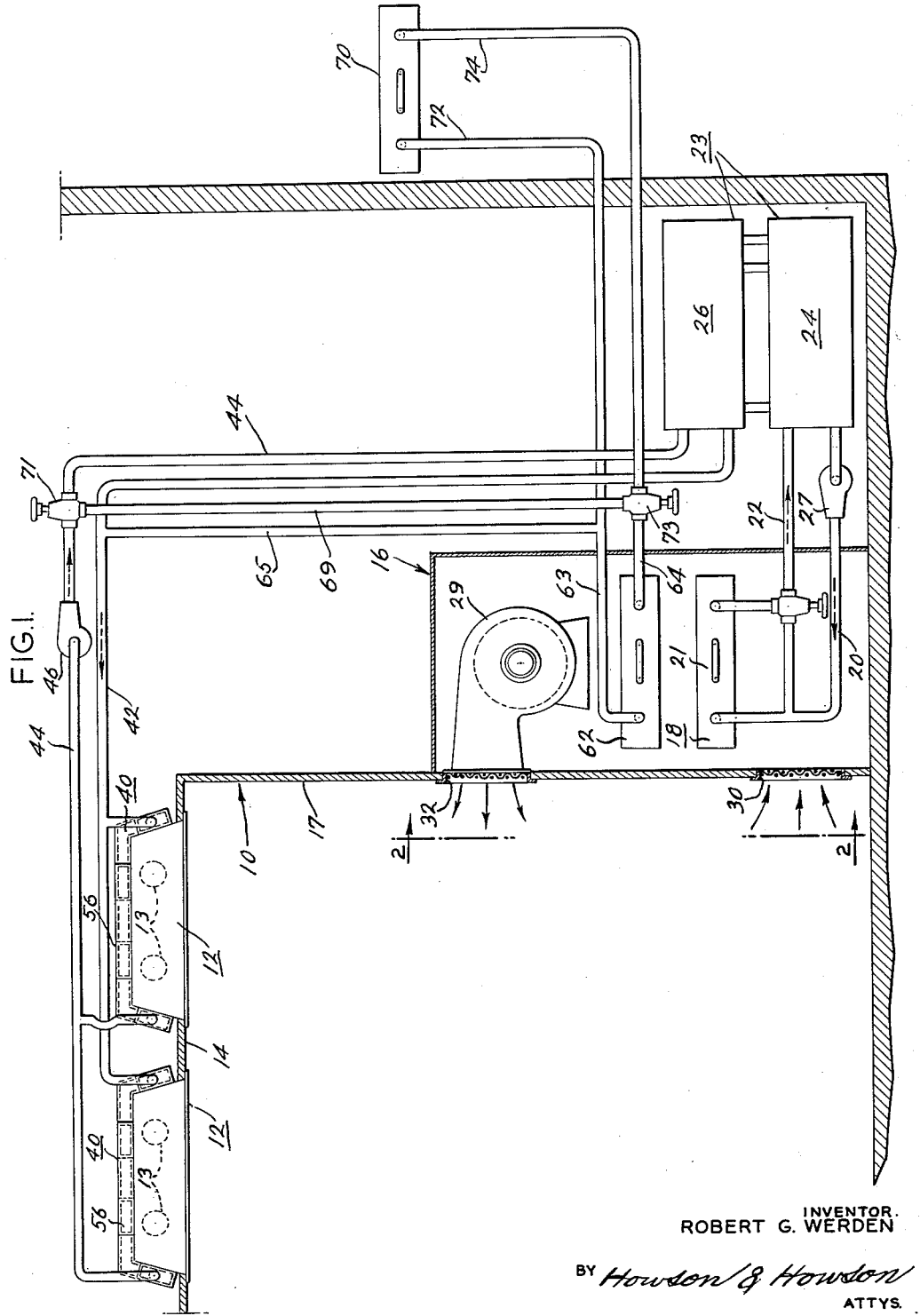

3,192,736
AIR CONDITIONING SYSTEM AND METHOD
Robert G. Werden, 221 W. Glenside Ave., Glenside, Pa.
Filed Aug. 30, 1963, Ser. No. 305,448
5 Claims. (Cl. 62—238)

The present invention relates to an improved system and method for conditioning air circulated in an enclosed space such as the room or rooms of a building having conventional lighting means therein. More particularly the present invention relates to a system and method for utilizing the heat energy of the lighting in the enclosed space as an energy source for operating a unit for conditioning the air in the space.

In many commercial structures such as office buildings lighting is used in many rooms of the building even during the daylight hours. As is commonly known, the energy required to light manifests itself in the form of heat in the rooms of the building. This heat energy is a benefit when it is desired to heat the rooms of the building. However, when it is desired to cool the rooms, it has been found that a substantial amount of the cooling capacity required to cool the rooms to a predetermined desired temperature level is used to offset the heat generated by the lights. Thus it is readily apparent that this air conditioning system is inefficient and costly.

The present invention provides a system and method for conditioning air in the room or rooms of a building wherein a substantial portion of the heat energy of the lighting is harnessed and utilized in the air conditioning unit. Accordingly, if the air conditioning unit is used to cool the room or rooms, only a small insignificant amount of the cooling load is required to offset the heat energy of the lighting and the heat energy harnessed is utilized, for example, in an absorption type air conditioning unit wherein refrigerant is conditioned to cool by addition of heat energy thereto. If desired, the air conditioning unit may include a heating coil whereby part of the heat energy may be used to heat fluid circulated through the heating coil and part of the heat energy may be used to cool thereby providing means for selectively regulating the temperature and humidity of the air circulated. Further if desired, the heat energy of the lights may be captured and conveyed to other areas or spaces of the building or to a rejection device outside the building.

Other objects of the present invention and a detailed description of the operation of the system and method are set forth more fully hereinafter with reference to the accompanying drawings, wherein:

FIG. 1 is a sectional view showing an air conditioning system in accordance with the present invention;

FIG. 2 is an enlarged fragmentary sectional view taken on lines 2—2 of FIG. 1; and FIGS. 3, 4 and 5 are perspective views showing various types of cooling chamber configurations through which a fluid or liquid may be circulated to absorb the heat energy of the lights.

Referring now to the drawings and particularly to FIG. 1 thereof, reference numeral 10 designates generally a space, such as a room of a building having conventional lighting fixtures or troffers 12 mounting bulbs or tubes 13 therein, the fixtures 12 being recessed in the ceiling 14 of the room 10 and an air conditioning unit 16 in a side wall 17 of the room. The air conditioning unit 16 includes air cooling means, for example a cooling coil 18 provided with the usual radiation fins 21, and a refrigerating unit 23, in the present instance an absorption type having a cooling section 24 and an energy input section 26. Inlet and outlet conduits 20 and 22 connect the cooling coil 18 to the cooling section 24 of the refrigerating unit, the inlet conduit 20 having a pump 27 for circulating a suitable volatile or nonvolatile refrigerant in the air conditioning unit. A fan 29 circulates air to be conditioned through an opening 30 adjacent the floor of the room over the cooling coils 18 and discharges conditioned air through an outlet opening 32 back into the room or space 10.

The absorption type refrigeration unit 23 is a conventional one wherein the energy input section 26 comprises the generator and the cooling section 24 may include an analyzer, an absorber, condenser and a rectifier. In the operation of an absorption type unit a refrigerant such as liquid ammonia vaporizes as it is circulated through the cooling coils 18 to absorb the heat of the air circulated effecting cooling of the same. The ammonia gas then is returned to the absorber where it is absorbed by a weak solution of ammonia in water (weak liquor) at a low temperature, the heat of solution being abstracted by water and a strong liquor being formed. The strong liquor is circulated through the generator where its temperature is raised and a mixture of water vapor an ammoni vapor is evolved. The gaseous mixture passes to the analyzer where it loses some of its vapor content. The ammonia and water vapor pass through the rectifier to the condenser, the condensed ammonia and water then passing through an expansion valve to the line 22 where it is again circulated through the cooling coils 18.

In accordance with the present invention a method and system are provided for collecting a substantial portion of the heat energy emitted by the lights 13 in the room and utilizing this heat energy, for example, in the energy input section 26 of the refrigerating unit 23 to condition the refrigerant for circulation through the cooling coils 18. To this end, means is provided to circulate a heat absorbent liquid or fluid between the light fixtures and the energy input section of the refrigerating unit to continuously absorb the heat energy given off by the lights and transfer the heat energy to operate the refrigerating unit. In the present instance this is accomplished by providing a cooling chamber 40 surrounding each of the light fixtures or troffers 12 connecting the cooling chambers 40 to the energy input section 26 of the refrigerating system by means of inlet and outlet lines 42 and 44 respectively. A pump 46 in the line 44 operates to circulate a liquid or fluid through the cooling chambers 40 and energy input section 24 whereby heat given off by the lights is absorbed by the fluid in the lines and conveyed to the energy input section 26 where the heat energy is given off to condition refrigerant circulated through the cooling coils 18.

The cooling chamber 40 may comprise various forms, for example, of the types shown in FIGS. 3, 4 and 5. The cooling chamber shown in FIG. 3 is an M-shaped arrangement of hollow, rectangular shaped channels 56, the inlet and outlet lines 42 and 44 being connected to the terminal ends of the leg portions of the M-shaped configuration. In FIG. 4 the cooling chamber is provided by a continuous coil 58 wound back and forth to cover the outer peripheral surface of the fixtures, the coil 58 having a continuous extension of the inlet and outlet lines 42 and 44. The cooling chamber shown in FIG. 5 comprises an inverted U-shaped member 60 spaced from the outer peripheral surface of the lighting fixture to provide a passage, the inlet and outlet lines being connected at opposite ends of the passage. By this arrangement, the cooling fluid or liquid passing through the system is in intimate contact with the entire peripheral surface of the lighting fixture.

Accordingly in the operation of the system described above, assuming the lights are being used in the room 10 and it is desired to cool the room, the pump 46 is operated to circulate a heat-absorbing fluid or liquid through the cooling chambers surrounding the lighting fixtures 12. In the system illustrated, the heat-absorbing fluid or liquid enters the cooling chambers from the line 42 where its temperature is raised by absorption of the heat from the lights and this heated liquid or fluid is moved by the pump 46 through the line 44 into the energy input section 26 of the refrigerating unit. In the energy input section 26, the heat of the liquid circulated through the cooling chamber 40 is given off and utilized to condition the refrigerant in the cooling section 24 for air cooling coil 18 and by means of the fan 29, air in the room is circulated over the cooling coils.

From the above it is readily apparent that the system of the present invention results in a substantial reduction in the energy required to cool a room. For example, heretofore a substantial portion of the cooling load was required to offset the heat energy of the lights. In accordance with the present invention, a substantial portion of the heat energy given off by the lights is absorbed, thus reducing the amount of cooling load required. Moreover, this heat energy captured from the lights is utilized in the refrigeration system thereby reducing considerably the total energy required for cooling purposes.

Another aspect of the present invention is the provision of means for utilizing the heat energy of lights in a closed space such as a room of a building for selectively conditioning the cooled air circulated by the refrigeration system or for heating another space or room in the building. To this end, the air conditioning unit includes a heating coil 62 between the fan 29 and the air cooling coil 18. The heating coil 62 is a conventional type and is connected to the system circulating fluid or liquid through the chambers by inlet and outlet pipes 63 and 64, the pipe 63 being connected through branch line 65 to the inlet line 42 and the pipe 64 being connected through branch line 69 to the outlet line 44. Valves 71 and 73 are provided at the terminal ends of the branch line 69. The valve 71 may be regulated to completely block flow from the line 44 to the energy input section 26 and divert the flow directly to the heating coil 62 through branch line 69 or conversely to completely to completely block flow to the heating coil 62 and divert it to the energy input section 26. Further if desired, the valve 71 may be adjusted to direct part of the heated liquid or coolant in the line 44 to the heating coil 62 and part to the energy input section 26. By this arrangement the heat of the lights absorbed in the system is utilized in part to operate the refrigeration system for cooling the room, and in part to heat the coils 62 whereby the humidity of the air directed into the room by the fan 29 may be controlled selectively.

If desired, the heating coil 62 may be disposed in another space for the purpose of heating only. In this event, the valve 71 may be regulated to block circulation through the energy input section 26 of the refrigeration system whereby heated liquid or fluid is directed solely to a heating coil disposed in another room.

If it is not desired to utilize the heat energy of the lights in the refrigeration system or in the heating coil 62, the heat energy may be dissipated outside the building. To this end, a heat rejection device 70 is provided and inlet and outlet lines 72 and 74 are provided for conducting the heat absorbing fluid or liquid circulated through the cooling chambers 40 through the heat rejection device 70. In the illustrated embodiment, the line 74 connects to one side of the valve 73 at the juncture of the line 64 and branch line 69 and the line 72 connects to the juncture of line 63 and branch line 65. Thus when it is desired to circulate through the heat rejection device 70 of the valve 71 is turned to direct flow of the heated liquid from line 44 through branch line 69 and valve 73 is turned to direct flow to the rejection device 70.

While a particular system and method for utilizing heat energy of lighting in an air cooling or air heating system, has been described herein, it is to be understood that changes and modifications may be made therein within the scope of the following claims.

I claim:

1. In a system for conditioning air in an enclosed space, lighting means, a fixture for said lighting means, an air conditioning unit including a cooling coil, a refrigerating unit consisting of an energy input section and a cooling section and conduit means connecting said cooling section with said cooling coil for circulating a refrigerant between said cooling coil and said cooling section, and means for collecting heat energy given off by said lighting means and utilizing it in said energy input section of said refrigerating unit to condition the refrigerant circulated between said cooling section and said cooling coil, said means for collecting said heat energy consisting of a cooling chamber disposed adjacent said lighting means and first flow lines connecting said cooling chamber to said energy input section of said refrigerating unit and means for circulating a heat absorbent fluid through said lines between said cooling chamber and said energy input section whereby heat energy of said lighting means is absorbed by said fluid in said lines and given off by said fluid to said energy input section.

2. In a system as claimed in claim 1 including a rejection device, second flow lines connecting said rejection device to said first flow lines and means for selectively controlling flow in said lines to circulate said heat absorbent fluid between said cooling chamber and said rejection device.

3. In a system as claimed in claim 1 wherein said cooling chamber comprises an M-shaped hollow channel and wherein said lines connect to the terminal ends of the leg portions of said M-shaped channel.

4. In a system as claimed in claim 1 wherein said lines wind back and forth across said light fixture to define the cooling chamber.

5. In a system as claimed in claim 1 wherein said cooling chamber comprises a continuous wall covering the exterior surface of said light fixture and spaced therefrom to define a passage coextensive with the peripheral surface of said light fixture.

References Cited by the Examiner

UNITED STATES PATENTS

| | | | |
|---|---|---|---|
| 1,985,636 | 12/34 | Foss | 62—238 X |
| 2,710,336 | 6/55 | Jorn | 165—56 X |
| 2,839,274 | 6/58 | Polin | 62—238 |
| 2,924,436 | 2/60 | Baran | 165—56 |

ROBERT A. O'LEARY, *Primary Examiner.*